May 14, 1946.  A. H. CADMAN  2,400,338
CLAMP FOR FLEXIBLE CONDUIT ATTACHING NUTS
Filed July 23, 1943
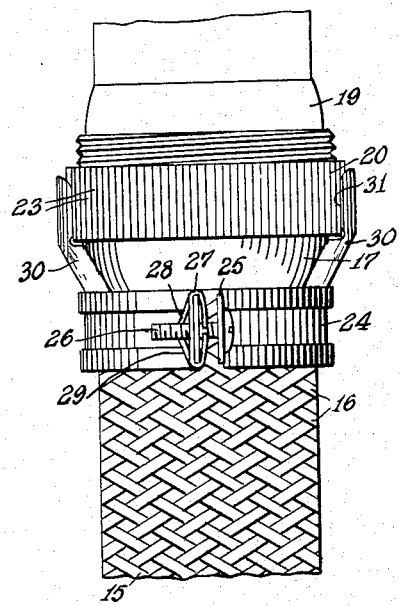
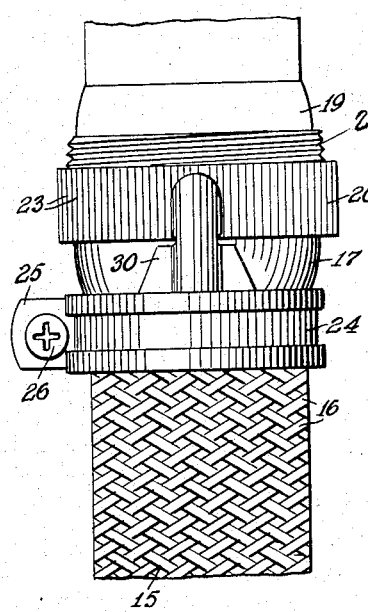
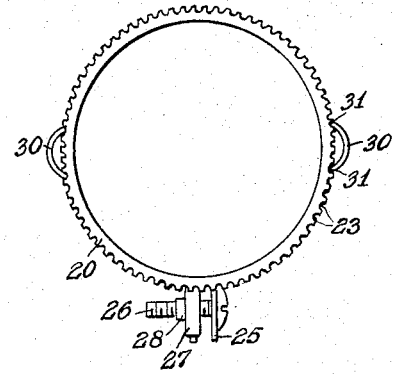
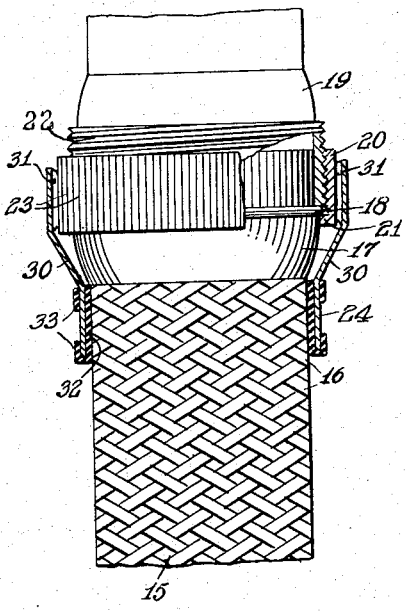
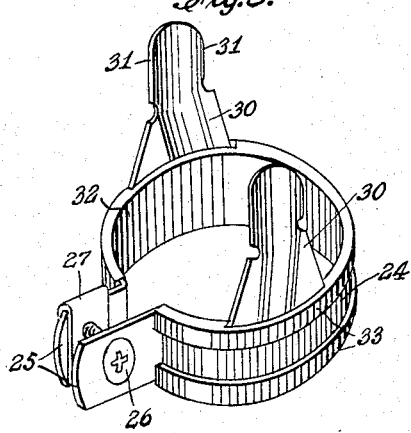
INVENTOR.
ARTHUR H. CADMAN
BY
Cousins + Cousins
ATTORNEYS Patented May 14, 1946

2,400,338

UNITED STATES PATENT OFFICE 2,400,338

CLAMP FOR FLEXIBLE CONDUIT ATTACHING NUTS

Arthur H. Cadman, Orange, N. J., assignor to Breeze Corporations, Inc., Newark, N. J., a corporation of New Jersey Application July 23, 1943, Serial No. 495,953

1 Claim. (Cl. 285—87)

This invention relates to clamping devices and more specifically to such as are adapted to positively prevent an attachment nut, carried by a cylindrical element, from becoming loose and displaced, relative to the part on which it is engaged.

While the present showing is that of a connector nut on a flexible tubular conduit, it will be apparent that the device is suited to a wide range of usefulness in other fields, where it becomes necessary to avoid movement of a rotative part, relative to a stationary cylindrical part; thus, the device is equally applicable to restrain a ring-like element of any kind from undesired rotation on a plain cylinder, even when subjected to jars, shocks, vibrations, and like adverse conditions tending to loosen the same.

An object of the invention is to provide a keeper clamp, suited to surround a tubular element, having a rotatable member at one terminal, with means to positively restrain the rotatable member from turning, when in an adjusted position, on the tubular element.

A further feature is in the provision of a clamp having a cushion on its inner surface effectually avoiding abrasion or other damage of the part to which it is applied.

Another purpose is to provide a clamp having means to adjustably engage in any of the creased corrugations formed in the periphery of a normally rotative element, used in connecting a tubular member to a fixed member.

These and other minor aims are attained by the novel, yet simple, construction, combination and arrangement of parts hereinafter described and illustrated in the accompanying drawing, constituting a graphical component of this disclosure, and in which:

Figure 1 is a front elevational view of an embodiment of the invention, showing its application.

Figure 2 is a similar view of the same, turned sidewise at a right angle relative to Figure 1.

Figure 3 is an end view of the clamp and coupling nut.

Figure 4 is a view similar to Figure 1, but showing the clamping device in partial longitudinal section.

Figure 5 is a perspective view of the clamp and cushion pad in detail.

The object selected to envision the application of the device is, in actual practice, a flexible metallic conduit 15 covered with braided tapes 16, which may consist of a single narrow metal strand, a flattened group of wires, or similar guards.

Set securely in the end of the conduit is an annulus 17 having an outstanding flange 18 at its outer end, which is shaped to engage a corresponding seat on a part 19 to which it is to be engaged by screw threads 22.

A cylindrical nut 20 is freely fitted on the extending end of the conduit 15, over the annulus 17, and provided with an internal flange 21 at the rear, inner end of the screw threads 22, the flange 21 abutting the flange 18 of the annulus.

The periphery of the nut 20 has formed in its entire circumference a plurality of closely adjacent longitudinal, shallow grooves 23 extending preferably over its entire surface; other types of corrugations, perforations, or even flat surfaces, may be employed if desired.

A clamp band 24, made of resilient sheet metal, is formed to loosely engage over the conduit and provided with substantially radial, outstanding flanges 25 having openings for the passage of a clamp bolt 26. One of the flanges is enveloped by a spring metal loop 27, its outer member presenting prongs 28 and 29 adapted to engage the threads of the bolt, in the manner of a nut, and also to lock the threads against casual loosening.

Extending from one edge of the band, in opposed relation to each other, and at right angles with the flanges 25, are two arms 30, each outbent to clear the nut 20 and having extensions to reach over the grooves in the nut.

Each of these arms, at their outer narrow portions, is shaped concavely, thereby forming detents 31 adapted to engage in the grooves to prevent the nut from turning when in adjustment.

In order to avoid abrasion of the conduit covering, and also to improve the adhesion, a strip of cushioning material 32, as rubber, is disposed over the entire inner area of the band 24, the edges of the strip being turned over upon the outer surface of the band, as at 33, forming channels for the band edges by which the cushion is held in place.

In operation, the clamp bolt is slackened to permit the clamp to pass freely over the conduit, the nut tightened on the part to which it is applied, the clamp moved to engage its detents with the corrugated or serrated surface of the nut, and then the bolt tightened to rigidly secure the clamp on the conduit.

It will be understood that the detents 31 may be made in different shapes to conform with the exterior of the nut; also the clamping means for the band 24 may be varied from that shown, and that the cushioning device may be of different forms from that indicated.

Although the foregoing is generally descriptive of the best known embodiments of the device, it is subject to such changes and modifications as are embraced in the claim hereto appended.

Having thus described the invention, what is claimed as new and desired to be secured by Letters Patent of the United States, is:

In combination with a flexible conduit adapted for end engagement with a fixed object and a coupling nut to cause such engagement, said nut being freely rotatable on said conduit but limited in lineal movement, means to prevent unintentional rotation of said nut comprising parallel grooves around the periphery of the nut, said grooves being parallel to the axis of the nut, and a clamp band adjustably secured on said conduit having one or more arcuate prongs the side edges of which are suited to lockingly engage in the grooves of said nut.

ARTHUR H. CADMAN.